United States Patent [19]

Faigle

[11] Patent Number: 5,413,872
[45] Date of Patent: May 9, 1995

[54] FILLING MEMBER

[75] Inventor: Heinz Faigle, Hard, Austria

[73] Assignee: Heinz Faigle KG, Hard, Austria

[21] Appl. No.: 278,717

[22] Filed: Jul. 22, 1994

Related U.S. Application Data

[63] Continuation of Ser. No. 934,972, Aug. 25, 1992, abandoned.

[30] Foreign Application Priority Data

Aug. 23, 1991 [AT] Austria .................... 1660/91

[51] Int. Cl.$^6$ ............... B32B 3/28; F28D 5/02
[52] U.S. Cl. ..................... 428/603; 165/166; 261/112.2
[58] Field of Search ........... 428/593, 586, 603, 604, 428/116, 118, 178, 184, 186; 165/166; 261/112.2

[56] References Cited

U.S. PATENT DOCUMENTS

| | | | |
|---|---|---|---|
| 2,135,432 | 11/1938 | Brodton | 165/166 |
| 2,804,284 | 8/1957 | Otten | 165/166 |
| 3,111,982 | 11/1963 | Ulbricht | 165/166 |
| 3,281,307 | 10/1966 | Moeller et al. | 261/112.2 |
| 3,775,234 | 11/1973 | Rich | 261/112.2 |
| 3,952,077 | 4/1976 | Wigley | 261/112.2 |
| 4,183,403 | 1/1980 | Nicholson | 165/166 |
| 4,314,605 | 2/1982 | Sumitomo et al. | 165/166 |
| 4,666,593 | 5/1987 | Bosne | 261/112.2 |
| 4,675,103 | 6/1987 | Nadudvari et al. | 261/112.2 |
| 4,706,741 | 11/1987 | Bolmstedt et al. | 165/166 |

FOREIGN PATENT DOCUMENTS

| | | | |
|---|---|---|---|
| 978935 | 12/1975 | Canada | 165/166 |
| 2029782 | 12/1971 | Germany | 165/166 |
| 1201151 | 5/1970 | United Kingdom | 165/166 |
| 513234 | 9/1976 | U.S.S.R. | 165/166 |
| 114653 | 3/1985 | U.S.S.R. | 165/166 |

*Primary Examiner*—John Zimmerman
*Attorney, Agent, or Firm*—Anderson Kill Olick & Oshinsky

[57] ABSTRACT

A filling member for use with installations where media are in direct contact for energy and/or mass exchange, or for chemical or biological reactions, or for mixing and separation processes, for instance, for trickling screens or mist eliminators in cooling towers, for direct heat exchangers, for drippers in biological waste water clarification plants, for chemical towers for liquid and/or gas distributors and mixers, for air feeders or the like is disclosed. The filling member comprises generally panel-like foils with waves or undulations including wave crests and wave troughs of predetermined amplitude and wavelength set against each other along their course, and are connected with each other for formation of flow ducts. The flow ducts have at least two reorientations or redirections in flow direction. The directly adjoining segments of two foils following each other in the layering are connected with each other exclusively zone-wise, and along the other portion of the length they leave a slit open which connects the side-by-side flow ducts. A cross-sectional surface of the slits amount only to a fraction of the cross-sectional surfaces of the flow ducts connected by the slits.

16 Claims, 5 Drawing Sheets

Fig. 13

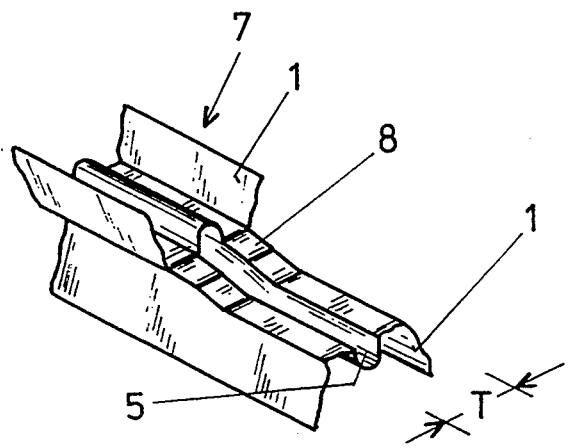
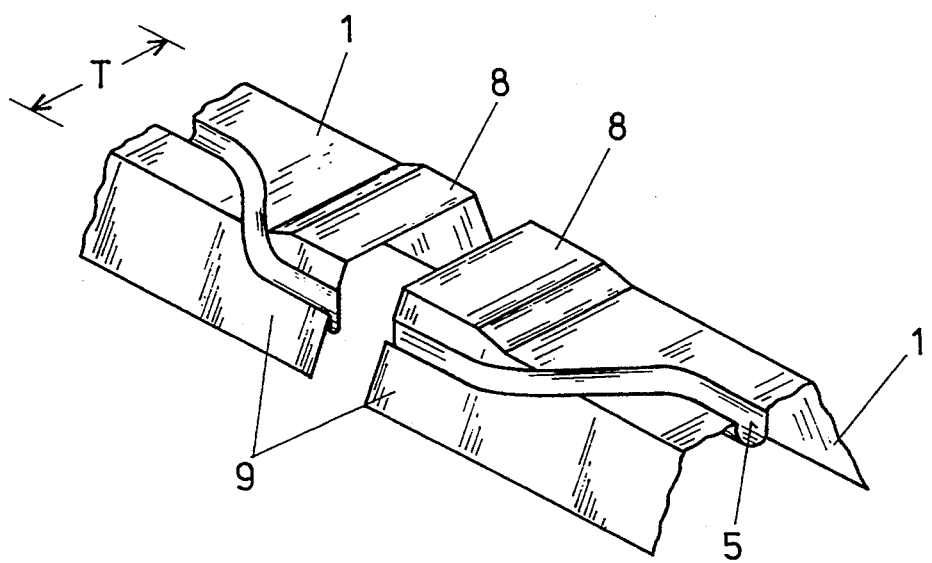

FILLING MEMBER

This is a continuation of application Ser. No. 07/934,972 filed Aug. 25, 1992, now abandoned.

FIELD OF THE INVENTION

The present invention generally concerns filling or packing members, and more specifically to filling or packing members where media are in direct contact for energy and/or mass exchange, or for chemical or biological reactions, or for mixing and separation processes.

BACKGROUND OF THE INVENTION

Filling members are used mostly for direct energy exchange where the energy exchanging media are in direct contact without, for example, being separated by a wall. Examples of such direct contact conditions may be heat exchange in cooling towers, direct mass transfer between media in evaporation cooling shares in cooling towers or in stripping processes. Filling members may also be used in connection with reactions between media in chemical towers, biological reactions in drippers for waste water clarification, for separation processes in mist eliminators in cooling towers, for liquid distribution air supply members and similar applications.

DE-PS 27 88 257 discloses a filling or packing member in which sheetlike foils formed in a wavy manner are situated with respect to each other and combined into a filling member in such a way that the segments, which are directly adjoining in the layering of the foils, contact one another.

Filling members with flow ducts whose axes have a three-dimensional course are also described in EU-OS 03 61 225, DA-AS 17 19 475 and DE-PS 10 59 888. CH-PS 556 010 describes a contact member for mass transfer, especially thermal transfer between a fluid and a gaseous medium. The contact member is fabricated from identically shaped trickling panels which are deformed in a trough-like manner. The panels consecutive within a package are situated so that the wave trains of adjoining panels cross each other. Wave troughs and wave crests or wave ridges of adjoining panels contact one another only in a point-shaped manner. These wave troughs and wave crests or wave ridges are flattened, segment-wise across their length so that if the trickling panels are assembled into a package, the wave troughs or wave ridges or adjoining panels can be connected with each other only in a portion of these crossing points or crossing regions. When viewed in horizontal direction, a slit-shaped opening, continuous in cross-section over the entire member appears whose effective course, however, is not slit-shaped. This slit-shaped view of the opening results only from vertical projection. In reality the course of this transverse channel is extraordinarily complicated. In previous trickling members, the liquid medium is supplied from the top side, while the gaseous medium flows through the contact member essentially transversely to the supply direction. The measure described reduces considerably the pressure loss of the flow-through medium, and reduces the flow resistance. An open channel is created in transverse direction, through which the gas can flow freely. Whether free flowing gas can considerably assist in the mass or energy exchange, however, is dubious, because the flowing gas is provided free passage and must no longer pass through the trickling member of this construction along a widely intertwined or sinuous path. The flow resistance will, without doubt, be considerably reduced by the described measure. The efficiency of this contact member will, however, be equally considerably reduced.

It is accordingly an object of the present invention to provide an efficient filling member.

Another object of the invention is to provide a filling member in which the flow resistance will not be considerably reduced.

SUMMARY OF THE INVENTION

These and other objects of the invention which shall become hereafter apparent, are achieved by a filling member comprising panel-like foils with waviness or undulations of a predetermined amplitude and wavelength which is set against each other, wave crest against wave trough, along their course for formation of flow ducts and are connected with each other. A planar foil is interposed between two foils with waviness. The flow ducts have at least two redirections in flow direction and preferably have crosssections of different magnitudes across their length. Segments of two successive foils in the layering lying directly next to each other are connected with each other exclusively zone-wise and across the other portion of their length, and leave open a slit connecting the adjoining flow ducts, with the cross-sectional area of the slit amounting only to a fraction of the crosssectional area of the flow ducts connected by the same.

BRIEF DESCRIPTION OF THE DRAWINGS

FIG. 2 is a cross-sectional view along line II—II in FIG. 1;

FIGS. 7-21 depict various embodiments of the course of the slit across its depths in the filling member;

FIGS. 23-24 are detailed depictions of a region of a connection point in the filling member.

DETAILED DESCRIPTION OF THE PREFERRED EMBODIMENTS

Figure 1:
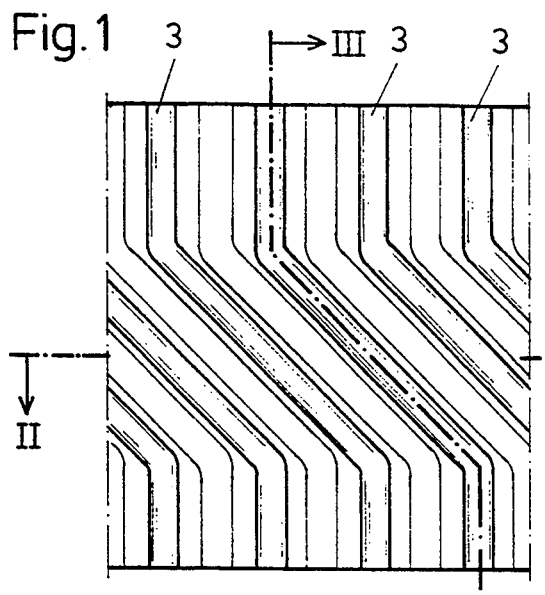
FIG. 1 is a front view of a filling member.
Figure 3:
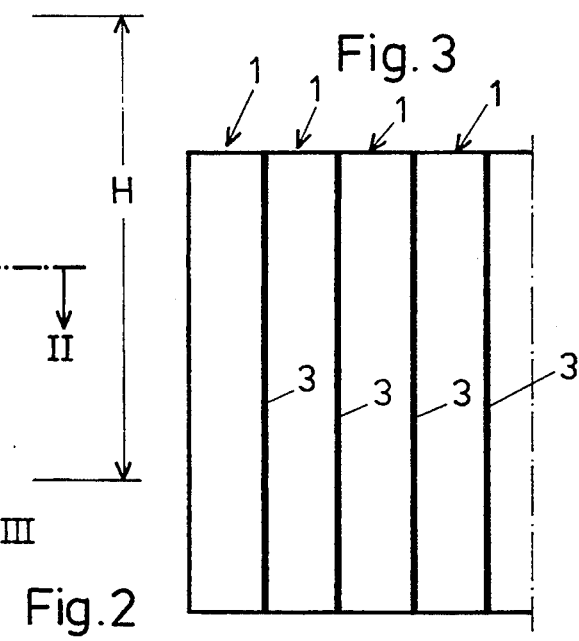
FIG. 3 is a side view of the filling member.

Referring now to the drawings, wherein like numerals reflect like elements throughout the several views, FIGS. 1-3 depict a filling member comprising panel-like foils 1 shaped in a wavy manner, comprising wave trough offset against wave crest, assembled to form flow ducts 2. The individual flow ducts 2 run in planes, but have two reversals on redirections in their course. The segments 3 of two foils in the layering lying directly side-by-side and contacting each other are hermetically bonded or welded across the entire height H of the filling member so that the individual flow ducts 2 are peripherally closed across their entire course.

Figure 4:
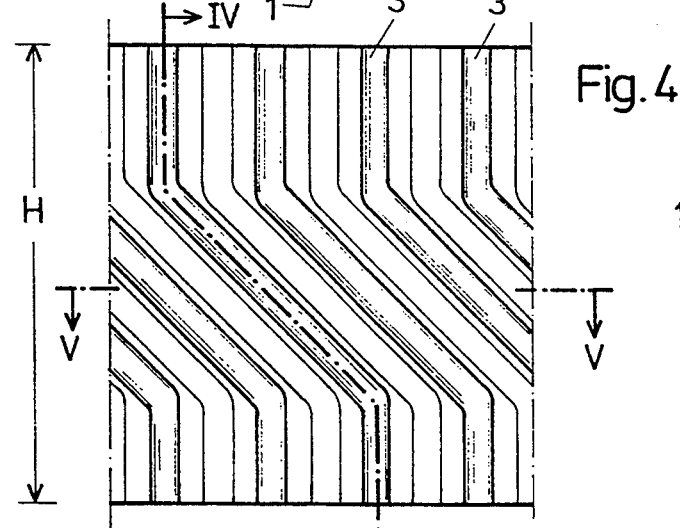
FIG. 4 is a front view of the filling member, fabricated from foils as they were used in the filling member in FIG. 1-3.
Figure 5:
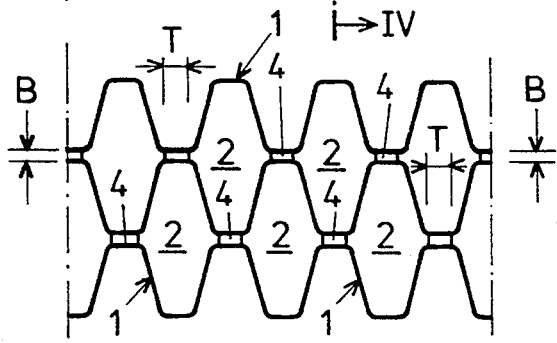
FIG. 5 is a cross-sectional view along line V—V in FIG. 4.
Figure 6:
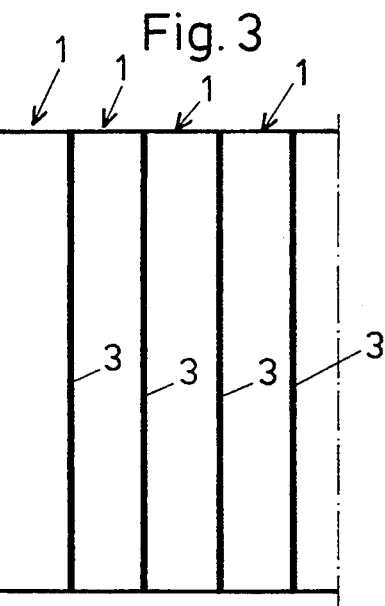
FIG. 6 is a cross-sectional view line VI—VI of FIG. 4.
Figure 25:
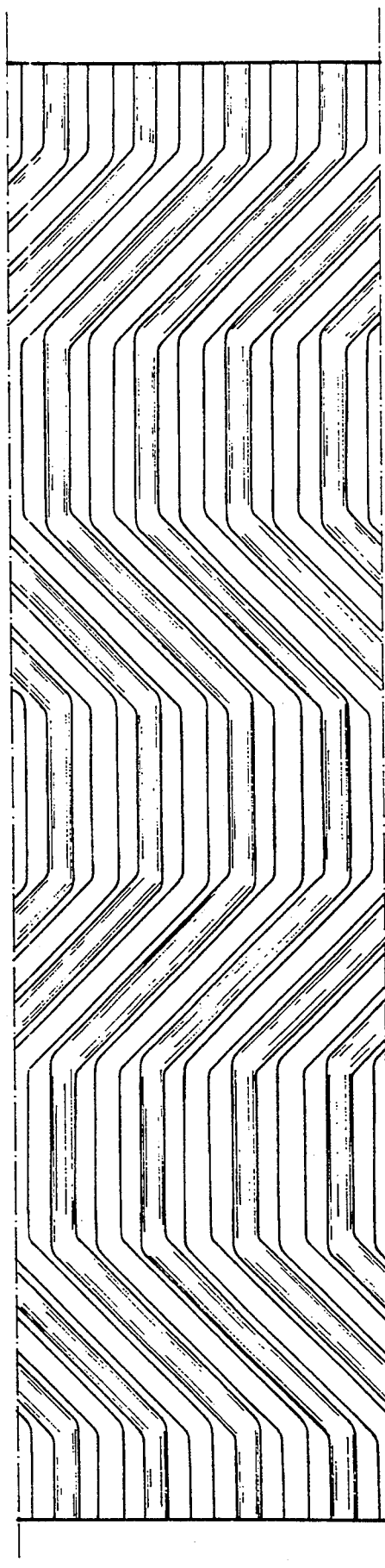
FIG. 25 is another embodiment of the filling member depicted in FIG. 4-6, with flow ducts having multiple sinuous windings.

FIGS. 4–6 depict a filling member built up corresponding to the filling members of FIGS. 1-3. The directly adjoining segments 3 of two side-by-side foils 1, however, are connected with each other exclusively zone-wise at the connecting points 7, which are of equal or unequal length as the segments 3 are somewhat spaced from each other over a portion of their length for formation of a slit 4 connecting the side-by-side flow ducts. As discerned from FIG. 6, the foils lying side-by-side are connected with each other only in the top 11 or bottom zone 12. Spacer platelets can be inserted into the connection area in the top segment 11 and the bottom segment 12 for forming the slit 4. Instead of such spacer platelets, the foils can be bulged out to such an extent at the points on one side or on both sides, that they contact each other directly only in this region and can be hermetically connected at these points. The foils, however, can also have projecting rises in the shape of lugs, multi-cornered or rounded disks, weld point groups, pressure fasteners or the like in the zones in which they are connected with each other and can also have matching depressions on the appropriate segment of the adjacent foil. In the embodiment shown, the flow ducts have two redirections in the flow direction. Several directions may be equipped to these flow channels so that they have a multiple sinuous, zig-zag or undulating course, wherein these flow ducts can extend in one plane, but also three-dimensionally (FIG. 25).

FIG. 5, as well as FIGS. 9–17, depict the shape of the slits. The width or breadth B of the slit 4 depends upon the thickness of the inserted spacer platelets or on the size and type of the shape of the foil in the region of the connecting points 7. The depth D of the slits depend on the forming and bulging shape of the foils and their waviness.

If filling members are built up exclusively from undulated or wavy foils, they can also be built up alternating from planar and wavy foils.

The flow ducts of the filling members shown in the drawings extend along a single plane and have two redirections or reorientations. The invention can also be applied to filling members having different forms, i.e., whose flow ducts run three-dimensionally. The term waviness is to be interpreted broadly, whether it extends in a sinuous curve shape and/or has angular contours.

The width or breadth B of the slit can vary depending upon the utilization of the filling member. The width of the slit can lie in the region of the surface roughness or the microwaviness of the panel-like foil due to its fabrication, although the tight adjoining positioning of two foil segments may provide a perception of smoothness, viewed by the unassisted eye. This is proved by a simple test. If two non-water repelling foils are wetted in a paper-thin manner, it is not possible to press the contact area of the folds dry, even if they are pressed together with considerable force. Similar behavior has been investigated in the area of tribology and it has been observed that even ground plane bearing surfaces lying against each other have an effective contact area of less than 5%. Slits with a larger width are also required. This width may differ, of course, depending upon the application and can be defined by its relationship to a cross-sectional measurement of the flow ducts which the slit interconnects. The width is preferably one-fifth of the largest diameter of the flow duct and practical tests have shown that a slit width of 0.05 to 1.00 mm has provided good results.

The adjacent segments of two side-by-side foils can be connected with each other at several points across the height H of the filling member so that several slits follow one another across the length of one flow duct. The length of the slit in relation to the length of one flow duct is approximately between one-third and two-thirds and can comprise several parts. Several slits 4 and several connection points 7 follow one another across the length of the flow duct. In the extreme, they are configured as a plurality of spacings between connection points or lines following one another consecutively with slight spacing.

Figure 7:
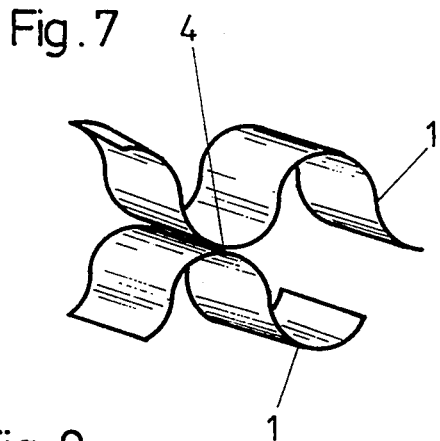
Figure 8:
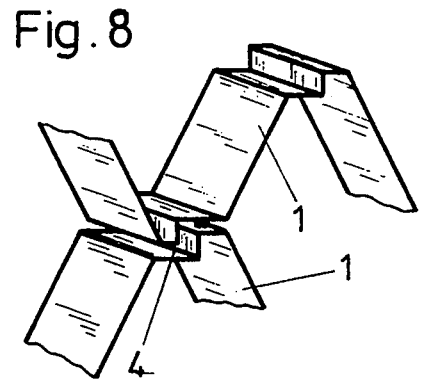
Figure 9:
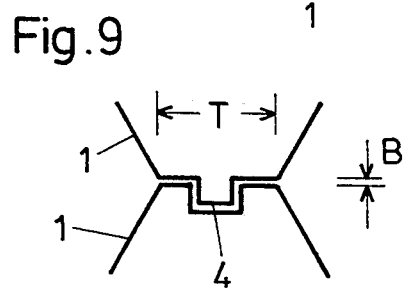
Figure 11:
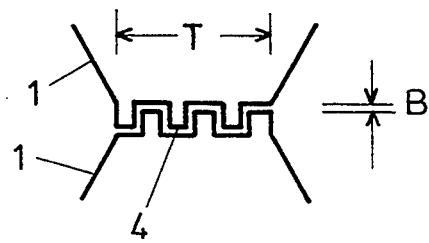
Figure 10:
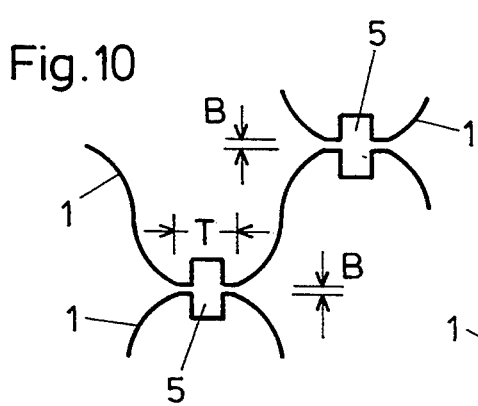
Figure 12:
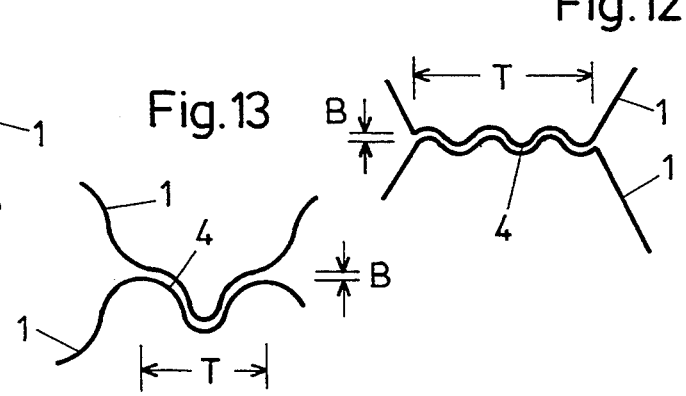
Figure 14:
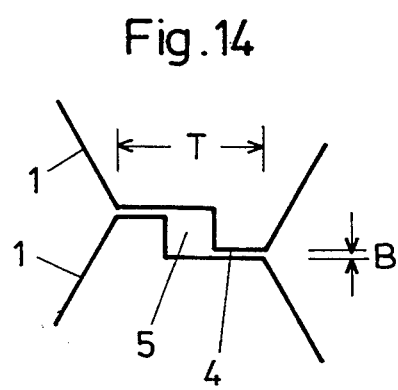
Figure 15:
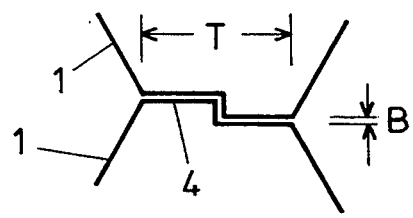
Figure 16:
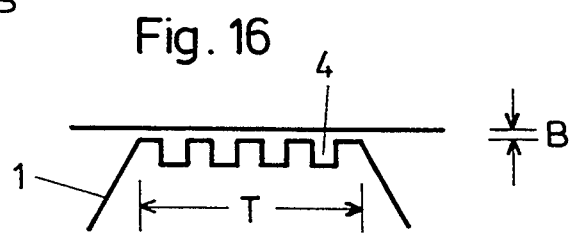
Figure 17:
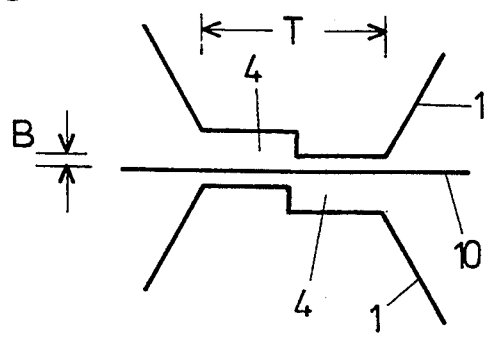
Figure 18:
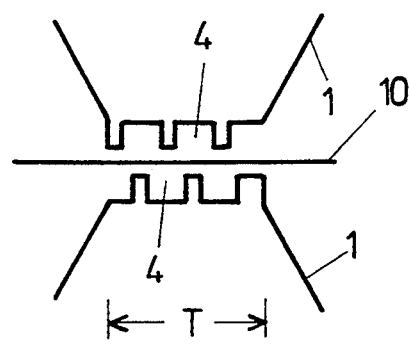
Figure 19:
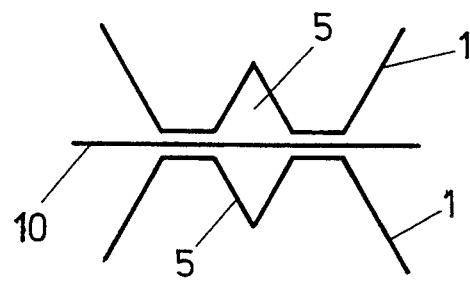
Figure 21:
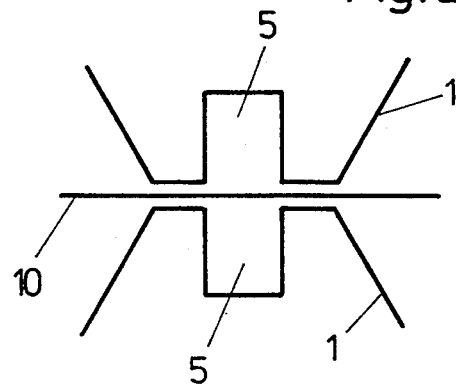
Figure 20:
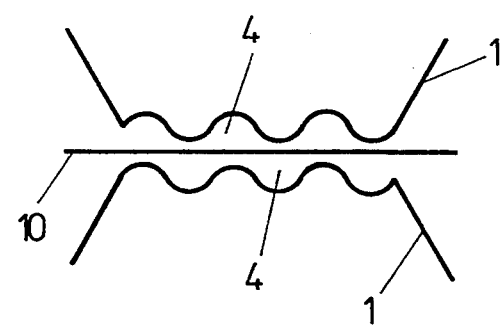
Figure 22:
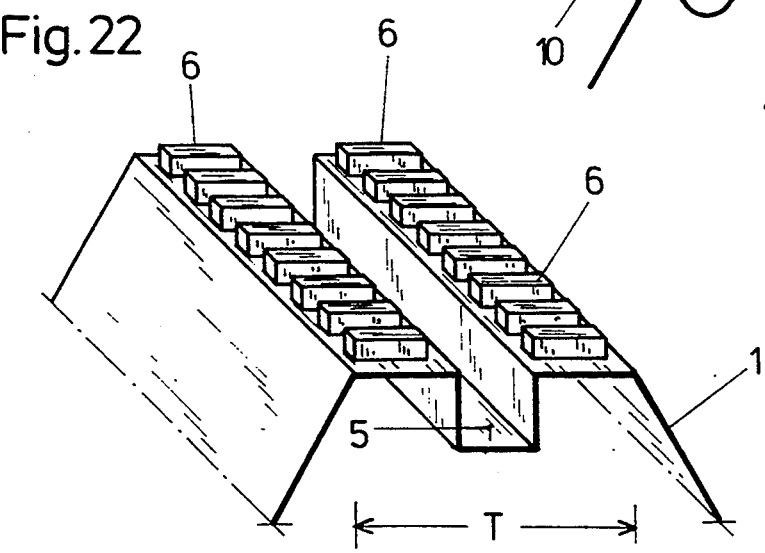
FIG. 22 is a detailed perspective view of a segment bounding a slit in the filling member.

The slits can run in different ways between two adjacent flow ducts and can be configured very differently across its depth as depicted in the various embodiments shown in FIGS. 7–21. FIG. 7 shows a slit which extends only as a line in the narrowest point between two rounded amplitude crests of foils lying opposite each other. The amplitude crests can, (see FIG. 5) however, be configured to be planar at its closest approach point and the slit 4 also has used a planar course in its depth as well as in its length. FIGS. 8, 9, 11, 14 and 15 depict slits 4 which have angular courses across their depth T. In the embodiment depicted in FIGS. 12 and 13, the slits 4 have a wavy course across their depth. In the embodiment depicted in FIG. 10, the segments are shaped symmetrically in a mirror image manner and bound the slit across its depth D. The segments are bulged in the central region so that the slit 4, viewed across its length, has a trough-like widening 5 in its central region. In the embodiment depicted in FIG. 16, a planar segment of another foil 10 lies opposite a segment of a wavy foil 1 bounding the slit 4 and extending in a tooth-shaped manner. FIGS. 17–21 depict other embodiments in which a planar foil lies between two wavy or undulated foils 2.

If the slit 4 has a trough-like widening 5, as depicted in the embodiments depicted in FIGS. 10 and 14 or 19 and 21, the foils are shaped to be matching in those regions where they contact each other for the purpose of a connection, so that the trough widenings 5 also pass through the connecting points 7, thus continuing across the length of the slit to form a peripherally closed piece of pipe. This is diagrammatically shown in FIG. 23. The foils 1 have bulged out shapes 8 for forming a connecting point 7 which are penetrated by through-like widenings 5 which form a peripherally closed piece of pipe in the region of the connecting points 7. If such a filling member is viewed in its entirety, the trough-like widenings 5 extend from edge to edge or across the entire length of its flow ducts.

If there is a danger of blocking in the region of the connecting point 7 when, for example, there is dirt-carrying or deposit precipitating media, the widenings 5 are pulled off sideways from the slit center prior to the fabrication of the bulgings 8 for the connecting point 7 and are conducted in the region of the connecting point 7 along a flank 9 of the foil wave until they discharge into the slit center after fabrication of the bulgings 8 for the connecting point 7. This is depicted in detail in FIG. 24. Such a trough course in the flank 9 in the region of the bulging 8 for the connecting points 7 are provided on those sides where a reduced air velocity and a reduced pressure is to be expected in the associated duct segment. The pressure distribution, as well as the velocity distribution, are of unequal magnitude, especially in direction changing ducts viewed across a cross-section of a duct segment.

Connection of the insides of the slits with one another by pipes or flanged troughs is important for the mist eliminators and comprises wavy foils connected with one another in vertical arrangements. In cooling towers, the mist eliminators accept the air flow interspersed with water droplets from the bottom in a first vertically standing segment of the ducts. The air flow is then deviated at an angle acute to the vertical by the duct and the first part of the droplets is projected against the duct walls by their inertia under the effect of centrifugal force and agglomerates there until the weight of the forming drops is greater than the retention force exerted by the action of the air flow. The drops then run toward the bottom down the walls or at the gussets of the ducts located at the foil connecting points.

In mist eliminators constructed per the invention, the droplets which are centrifuged out can more easily agglomerate in the slit. Because a lower pressure exists in the following portion of the adjoining flow duct than in that segment of the duct from which the droplets were ejected, the drops can follow the centrifugal and air pressure path through the slit and drain on the other side until they arrive at the following duct deviation, where this process is repeated in the reversed flow direction through the slit. In a tight slit with capillary effect, the adhesion between the water and the slit wall and/or the water agglomerization in the steps, waves and other baffles built in possibly into the depth of the slits is sufficiently large so that the liquid medium seals the slit against a gaseous medium acting as a blocking liquid. The air must therefore follow the duct undulations and project the drops against or into the slit in the pressure sides of the ducts.

The profilings of the cross-sectional contours of the slits 4, shown in FIGS. 8–21 oppose, on one hand, a larger resistance to that one-sided higher pressure of the air than planar slit cross-sections. On the other hand, the centrifuged droplets find more adhesion surface and an undisturbed possibility for agglomeration in the profiles of these segments. This is assisted by the described trough-like widening 5 in the central region of the depth of a slit 4 (see FIGS. 10, 14, 19, 21) which enables an unopposed drainage of the separated water.

The redirection of the trough-like widenings 5 of the slits 4 onto the flanks 9 of the ducts are provided at both sides. A reduced pressure and a reduced air velocity is accordingly expected. The pressure distribution as well as the velocity distribution are of unequal magnitude when viewed in direction changing ducts across a respective cross-section, or the respective flow direction of a duct segment.

FIG. 22 is a perspective view of a slit defining segment 3 of a wavy foil 2. This segment 3 has a wave or tooth-shaped profile 6, which extends transversely or obliquely to the longitudinal direction of the slit. The axes of these individual profiles can stand at right angles or obliquely to the longitudinal direction of the list. The thus shaped segments 3 defining or rounding the slit can be disposed in such a way that these profiles interengage in tooth-like fashion. Since the axes of these profiles are oriented obliquely to the air flow in the duct 2 and lie in the direction in which the drops are ejected, the drops can penetrate into the slit 4 in a preferential manner. The above operation of the mist eliminators generally address the media with respect to and against each other which obtain in the filling members, as well as with the flow control and its utilization.

The filling members belong to the class of laminator systems which are built up into a package of connected wavy foils, possibly with one planar foil between the wavy foils and are intended for the common passage of differing media without intermediate walls separating the different media. The filling members are of two different types within this species. In one type, the wavy or undulated foils located side-by-side are connected with each other so that they form continuous ducts from one foil edge to the other foil edge. These ducts have directional changes in their course whereby the cross-sections of differently oriented duct segments are different and will cause velocity and pressure differences from segment to segment in the media flows. In another type, the filling members are of a constructional type where some of the spacings are provided between the foils of the laminator package. In conventional types, however, the media moves not only in the principal direction, but also obliquely without any considerable hindrance, in order to compensate pressure and mass differences between the ducts. The spacings were made large and, in addition, the wavy foils were often stacked crosswise in order to achieve this.

In the present invention however, measures are provided as to how connections between the side-by-side ducts have to be configured so that an unlimited flowover of the media is prevented. These measures, as explained in detail above, make it possible to continue to maintain the velocity and pressure differences in the course of the differently oriented duct segments, and yet provide cross passages between the ducts located next to each other in a group.

This is achieved by providing the connections from duct to duct through slits, whose quantity or lengths along the duct and whose shape and profile are configured so that passage of the media therethrough is impeded such that the principal flow of the media remains as heretofore in the ducts.

Details of the filling member or wave and duct-shape result may vary in actual use depending upon whether the filling member is to convey the media through a mixing system, an exchange system, a reaction system, or a separation system. In mixing systems, the Vortex effect during direction change of the ducts and the flow velocity of the media mixture across the duct cross-section is utilized. The sum of the through-flow cross-section of the slit is made large because of the intermixing, however not so large that the guidance task of the ducts is rendered impossible.

In the inter- or exchange-systems, the Vortex effect is also used through redirection and unequal flow velocities in the ducts for blending the media which have to exchange energy and/or mass. If the exchangeable media have different densities and/or viscosities, especially when there are different states of aggregation, there arises different pressure and velocity relationships before or after each change of direction between the two flow shares lying opposite each other in every duct. The media shares of the one type are located, figuratively speaking, on the left side of the slits and the media of the other type on the right side. They act even more upon each other through the slits. In the next change of direction, the conditions in the duct are reversed, which incites the different media to the opposite migration and cause mutual interpenetration to new exchange—promoting contacts. These processes are particularly clear in liquid/gas-systems, as for instance, trickling screens in cooling towers where the hot water transfers not only heat and energy to the air, but also evaporation particles of the water by way of mass transfer.

Similar processes are seen in reaction systems. In addition to the mixing effect of the media and the chemical or biological reaction through the slits, there is added the phenomenon that some reactions proceed faster and more productively than if only additional energy is added with, for example, mechanical or hydraulic, or aerodynamic friction which is assisted apart from the vorticity by the slit effect.

In biological reactions, algae or incrustation must be taken into account. In drippers for waste water, for instance, clearing the slits or gaps should have relatively large dimensions since the substrates are fouled by the cultures of the smallest living organisms in a certain thickness up to dung solution, which is also referred to as filter film. All of these things lead to a constriction of the slits. We have thus dealt with the separation system when describing the processes in a mist eliminator. Other examples are the stripping of gases and separation processes in liquid/liquid, gas/gas and gas/liquid systems.

If slit segments in separation systems are connected with each other in the trough course, mostly such overall troughs are closed at or in the ends located in the principal flow direction or they are not provided in this region so that the separated medium cannot escape there toward the top.

Materials for the filling members comprise mostly plastics materials or metals of a foil thickness of 0.2 to 1 mm. For special cases, thicker walls or other materials such as glass or ceramics can be useful.

The slits of a filling member can be equal in size and shape, but can, of course, vary according to the application. Ribs, lugs, bulges and the like in addition to undulations of the filling member can influence the flow of the media.

While the preferred embodiments of the invention have been depicted and described in detail, modifications and adaptations may be made thereto without departing from the spirit and scope of the invention, as delineated in the following claims:

What is claimed is:

1. A filling member for use in an installation in which different media are in direct contact with each other for separating liquid droplets from a gaseous flow, said filling member comprising a plurality of undulated panel foils having undulations of amplitude and wavelength and set against each other;

wherein said undulated panels are set against each other, wave crest against wave trough along a length thereof for forming flow ducts;

wherein said flow ducts have at least two redirections in a direction of flow, whereby different pressure conditions are created across a duct cross-section;

wherein respective segments of two adjacent foil panels are connected with each other along a portion of a common length thereof, with a remaining portion of the common length thereof forming a slit connecting adjacent flow ducts, defined by the respective segments, extending substantially transverse to a longitudinal extent of said filling member, and having a cross-section which is a fraction of the duct cross-section and is able to provide a capillary action, whereby liquid droplets, which are thrown against said slit by a centrifugal force generated by the different pressure conditions in a respective one of said adjacent flow ducts, are forced into said slit by the centrifugal force and the capillary action and are retained in said slit by the pressure conditions in another of said adjacent flow ducts.

2. The filling member of claim 1, wherein said slits are in longitudinal regions of the flow ducts and have a reduced cross-section compared to other longitudinal regions.

3. The filling member of claim 1, wherein a width of the slit lies in the range between about 0.05 and 1.5 mm.

4. The filling member of claim 3, wherein the width of the slit is between approximately 0.05 and 1.00 mm.

5. The filling member of claim 1, wherein the width of the slit amounts at most to one fifth of the largest diameter of the flow duct.

6. The filling member of claim 1, wherein the width of the slit amounts from one tenth to one twentieth of the amplitude of the wave.

7. The filling member as in claim 1 wherein cross-sectional contour of at least one segment of two adjacent foils bounding as slits in its depth, extends in an offset manner, in an undulated manner or is toothed, and wherein said slits further comprise slit segments of different slit width across its depth.

8. The filling member as in any one of claims 7, wherein cross-sectional contours of the segments of two adjacent foils bounding the slit in its depth, extends in mutually matching manner to be step-wise offset, undulated or toothed, and the slit comprises slit segments at an angle to each other across its depth.

9. The filling member of claim 8, wherein trough-shaped slit segments formed by the largest slit width are connected with each other in a pipe-shaped manner through the connections of the foils.

10. The filling member of claim 7, wherein the slit segments extending at an angle to each other across the depth of the slits have different slit widths.

11. The filling member of claim 10, wherein the slit segments located in the central region of the depth of the slit have the greatest slit width.

12. The filling member of claim 10, wherein several slits follow one another along the length of one flow duct.

13. The filling member of claim 1, wherein the length of the slit is between one and two thirds of the length of the flow duct.

14. The filling member of claim 1, wherein the segments bounding a slit comprises at least a partially undulated profile extending transversely to a longitudinal direction of the slit.

15. The filling member of claims 14, wherein trough-shaped slit segments are continued in the region of connection points and extends at the sides of connecting points at the flanks of the ducts.

16. The filling member of claim 15, wherein the slits provided in said filling member between adjacent flow duct of the individual or of all wave or undulations of wave groups of the foils are differently shaped, and/or have different lengths.

* * * * *